UNITED STATES PATENT OFFICE.

GEORGE SAGAR, OF CHICAGO, ILLINOIS, ASSIGNOR TO CHICAGO WASTE-CLEANSING COMPANY, OF SAME PLACE.

IMPROVEMENT IN CLEANING COTTON-WASTE.

Specification forming part of Letters Patent No. 139,921, dated June 17, 1873; application filed April 28, 1873.

*To all whom it may concern:*

Be it known that I, GEORGE SAGAR, a citizen of England and subject of Great Britain, temporarily residing in Chicago, county of Cook and State of Illinois, have invented a new and useful Compound for Cleansing Fibrous Substances, of which the following is a specification:

The object of the present invention is to provide suitable means for cleansing fibrous substances such as those for packing-boxes, journals, and other purposes: and its nature consists in the use of spirits of salt and nitric acid combined with water, brought to a suitable heat. In this solution the fabric is first treated, after which the substance is treated with a solution of soda-ash, as hereinafter fully described.

I take equal parts of "spirits of salt" and nitric acid, and to these add so much water that the mixture will stand, when cold, at 1° by Twaddel glass No. 1. When the fabric can stand for about twelve (12) hours the mixture should be brought to 120° Fahrenheit, and the steam then cut off and the fabric immersed, any suitable vessel being used for that purpose; but when the cleansing is to be done in the space of about three hours, the mixture should, before immersing the fabric, be raised to 140° Fahrenheit, when equal proportions of spirits of salt and nitric acid to bring the mixture up to 2° by No. 1 Twaddel should be added. This compound can be used for an indefinite time by precipitating the oil and dirt, which is done as follows: The compound is allowed to cool, and is then drawn off above the line of sediment. To separate the oil from the dirt, add water to the sediment and bring it to a boiling heat. This will when cool leave the oil on top of the water and the sediment at the bottom of the receptacle. To complete the cleansing process, the fabric should, as soon as removed from the above mixture, be thoroughly rinsed in cold water to wholly remove the acids. The fabric is then immersed in a solution of water and soda-ash of such strength as will stand 3° by Twaddel No. 1, and boiled for about nine hours. The fabric is removed from the soda solution, thoroughly rinsed to remove the soda, and then dried. To save the oil in the soda-water, add nitric acid to the water in proportion of one part of acid to about two hundred parts of soda liquid. Then skim the oil off.

Having thus described my invention, what I claim, and desire to secure by Letters Patent of the United States, is—

The ingredients herein set forth for cleansing fabrics, when combined and used substantially as described.

GEORGE SAGAR.

Witnesses:
G. L. CHAPIN,
HENRY TANNER.